US009775412B2

(12) United States Patent
Lin

(10) Patent No.: US 9,775,412 B2
(45) Date of Patent: *Oct. 3, 2017

(54) INVISIBLE ZIPPER HEAD ASSEMBLY STRUCTURE FOR INCREASING POSITIONING EFFECT AND SLIDING MEMBER THEREOF

(71) Applicant: CHUNG CHWAN ENTERPRISE CO., LTD., Tao Yuan Hsien (TW)

(72) Inventor: Yu-Pau Lin, Taoyuan (TW)

(73) Assignee: CHUNG CHWAN ENTERPRISE CO., LTD., Taoyuan Hsien (TW)

( * ) Notice: Subject to any disclaimer, the term of this patent is extended or adjusted under 35 U.S.C. 154(b) by 18 days.

This patent is subject to a terminal disclaimer.

(21) Appl. No.: 14/921,721

(22) Filed: Oct. 23, 2015

(65) Prior Publication Data
US 2017/0035154 A1    Feb. 9, 2017

(30) Foreign Application Priority Data

Aug. 5, 2015    (TW) .............................. 104212605 A

(51) Int. Cl.
*A44B 19/30* (2006.01)
*A44B 19/26* (2006.01)
(Continued)

(52) U.S. Cl.
CPC ............ *A44B 19/262* (2013.01); *A44B 19/04* (2013.01); *A44B 19/308* (2013.01); *F16B 2/22* (2013.01);
(Continued)

(58) Field of Classification Search
CPC ............ Y10T 24/2561; Y10T 24/2566; Y10T 24/2568; Y10T 24/257; Y10T 24/2571;
(Continued)

(56) References Cited

U.S. PATENT DOCUMENTS 4,409,705 A * 10/1983 Yuunaga ................ A44B 19/26
24/415
5,544,394 A * 8/1996 Yaguramaki ......... A44B 19/308
24/424
(Continued)

*Primary Examiner* — Robert J Sandy
*Assistant Examiner* — Michael Lee
(74) *Attorney, Agent, or Firm* — Li & Cai Intellectual Property (USA) Office

(57) ABSTRACT

An invisible zipper head assembly structure includes a sliding member and a pulling member. The sliding member has a base portion, a first lateral wall portion, a second lateral wall portion, a seat portion, an elastic component, and a retaining body. The retaining body has a positioning portion passing through a positioning through hole of the seat portion. The pulling member is movably mated with the retaining body. The thickness of the first lateral wall portion is smaller than the thickness of the second lateral wall portion. The first symmetric center line of the base portion passes through a geometric center point of the positioning through hole, and the second symmetric center line of the seat portion is horizontally moved relative to the first symmetric center line by horizontal offset and along a horizontal direction from the second lateral wall portion to the first lateral wall portion.

18 Claims, 12 Drawing Sheets

(51) Int. Cl.
 *A44B 19/04* (2006.01)
 *F16B 2/22* (2006.01)
(52) U.S. Cl.
 CPC ........ *Y10T 24/2566* (2015.01); *Y10T 24/2577* (2015.01)
(58) Field of Classification Search
 CPC ............. Y10T 24/2573; Y10T 24/2575; Y10T 24/2577; A44B 19/308; A44B 19/26; A44B 19/30; A44B 19/306
 See application file for complete search history.

(56) References Cited

U.S. PATENT DOCUMENTS

| | | | | |
|---|---|---|---|---|
| 5,809,622 | A * | 9/1998 | Yaguramaki | A44B 19/308 24/419 |
| 9,125,459 | B1 * | 9/2015 | Lin | A44B 19/26 |
| 2002/0189057 | A1 * | 12/2002 | Lin | A44B 19/308 24/421 |
| 2013/0139363 | A1 * | 6/2013 | Sato | A44B 19/28 24/427 |
| 2014/0338158 | A1 * | 11/2014 | Lin | A44B 19/26 24/431 |

\* cited by examiner

INVISIBLE ZIPPER HEAD ASSEMBLY STRUCTURE FOR INCREASING POSITIONING EFFECT AND SLIDING MEMBER THEREOF

BACKGROUND OF THE INVENTION

1. Field of the Invention

The instant disclosure relates to a zipper head assembly structure and a sliding member thereof, and more particularly to an invisible zipper head assembly structure for increasing positioning effect and a sliding member thereof.

2. Description of Related Art

In general, zippers are basic elements in clothing or accessories. Compare to buttons, the zippers are easier to use. A conventional zipper comprises a zipper head and a tape. The zipper head works with the tape to allow the pulling action. Recently, the zipper has been used commonly for clothing, pants, backpack, and other accessories.

SUMMARY OF THE INVENTION

One aspect of the instant disclosure relates to an invisible zipper head assembly structure and a sliding member thereof for increasing positioning effect of the sliding member on a zipper teeth structure.

One of the embodiments of the instant disclosure provides an invisible zipper head assembly structure, comprising a sliding member and a pulling member. The sliding member has a base portion, a first lateral wall portion, a second lateral wall portion, a seat portion, an elastic component, and a retaining body. The first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole. The pulling member is movably mated with the retaining body. More precisely, the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion. More precisely, the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion.

Another one of the embodiments of the instant disclosure provides a sliding member comprising a base portion, a first lateral wall portion, a second lateral wall portion, a seat portion, an elastic component, and a retaining body. The first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole. More precisely, the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion. More precisely, the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion.

Yet another one of the embodiments of the instant disclosure provides an invisible zipper head assembly structure disposed on a zipper teeth structure including a first zipper teeth member and a second zipper teeth member mated with each other. The invisible zipper head assembly structure comprises a sliding member and a pulling member. The sliding member has a base portion, a first lateral wall portion, a second lateral wall portion, a seat portion, an elastic component, and a retaining body. The first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole. The pulling member is movably mated with the retaining body. More precisely, the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion. More precisely, the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion. More precisely, the first zipper teeth member includes a first zipper teeth carrier and a plurality of first zipper teeth disposed on the first zipper teeth carrier, the second zipper teeth member includes a second zipper teeth carrier and a plurality of second zipper teeth disposed on the second zipper teeth carrier, and one of the first zipper teeth is retained between two of the second zipper teeth to form a gap for receiving the positioning portion.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
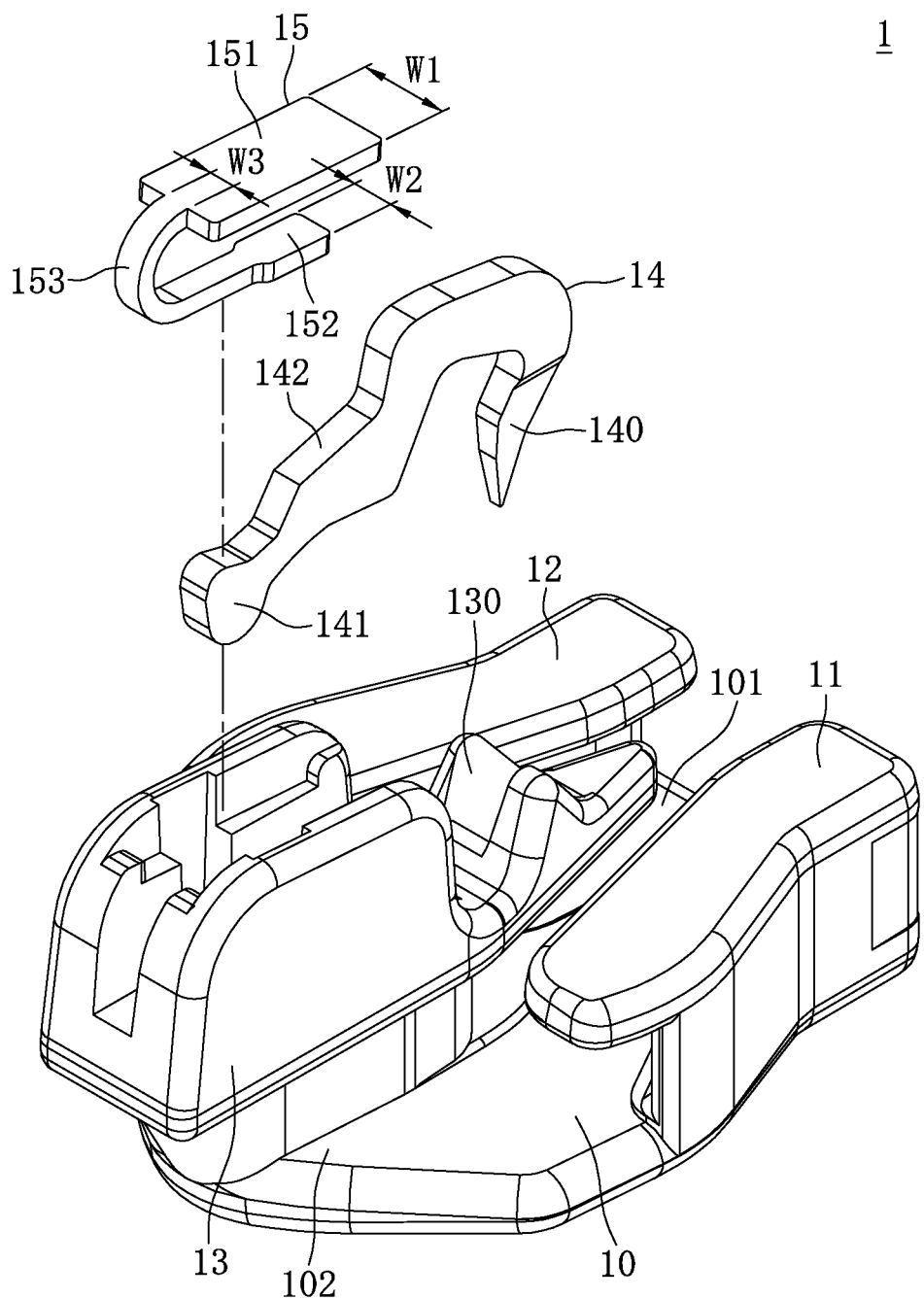
FIG. 1 shows a perspective, exploded, schematic view of a sliding member for increasing positioning effect according to one of embodiments of the instant disclosure.

The embodiments of "an invisible zipper head assembly structure for increasing positioning effect and a sliding member thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 6, one of embodiments of the instant disclosure provides a sliding member 1 (such as a sliding head, or a slide fastener head) for increasing positioning effect, and the sliding member 1 comprises a base portion 10, a first lateral wall portion 11, a second lateral wall portion 12, a seat portion 13, an elastic component 15, and a retaining body 14 (such as a hook body or a horse-like hook).

Figure 2:
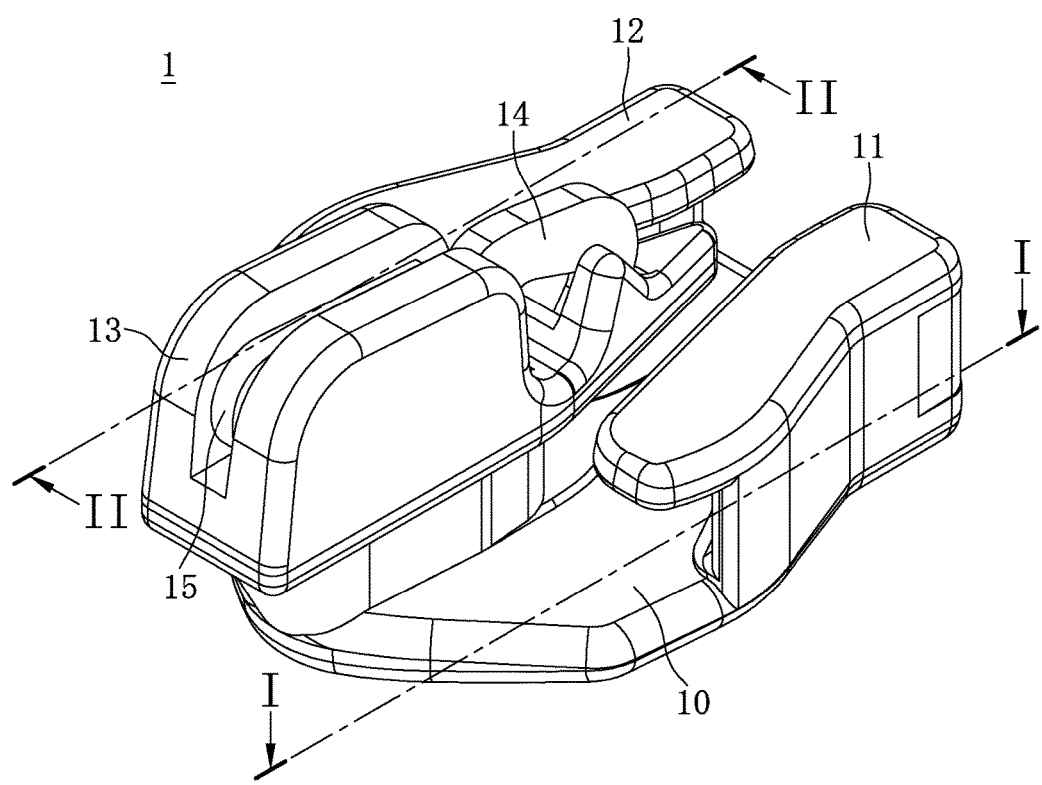
FIG. 2 shows a perspective, assembled, schematic view of a sliding member for increasing positioning effect according to one of embodiments of the instant disclosure.
Figure 3:
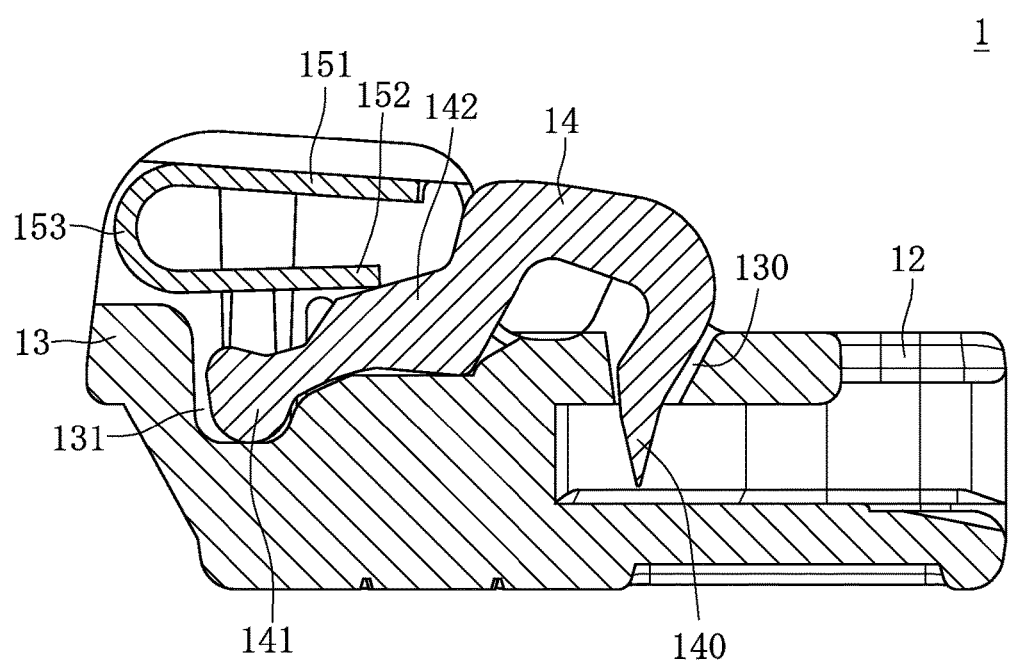
FIG. 3 shows a cross-sectional view taken along the section line I-I of FIG. 2.

First, referring to FIG. 1 to FIG. 3, the first lateral wall portion 11 and the second lateral wall portion 12 are respectively extended upwardly from two opposite lateral sides of the base portion 10, and the first lateral wall portion 11 and the second lateral wall portion 12 correspond to each other and are connected to a front side portion 101 of the base portion 10. The seat portion 13 is disposed on the base portion 10 and is connected to a rear side portion 102 of the base portion 10, and the seat portion 13 has a positioning through hole 130 formed between the first lateral wall portion 11 and the second lateral wall portion 12. The elastic component 15 is disposed inside the seat portion 10. The retaining body 14 is movably disposed on the seat portion 13 and movably contacts the elastic component 15, and the retaining body 14 has a positioning portion 140 disposed on an end portion thereof and passing through the positioning through hole 130.

More particularly, referring to FIG. 1 to FIG. 3, the elastic component 15 has a fixed retaining portion 151 retained inside the seat portion 13, a movable contacting portion 152 opposite to the fixed retaining portion 151 and parallel to the fixed retaining portion 151, and a bending connection portion 153 connected between the fixed retaining portion 151 and the movable contacting portion 152. In addition, the retaining body 14 has an embedded portion 141 opposite to the positioning portion 140 and disposed inside a receiving groove 131 of the seat portion 13 and an abutting portion 142 disposed between the positioning portion 140 and the embedded portion 141 and movably contacting the movable contacting portion 152. For example, the fixed retaining portion 151, the bending connection portion 153, and the movable contacting portion 152 are sequentially connected to one another to form a U-shaped elastic piece. Further, the width W2 of the movable contacting portion 152 is larger than the width W3 of the bending connection portion 153, and the width W1 of the fixed retaining portion 151 is larger than the width W2 of movable contacting portion 152.

Figure 4:
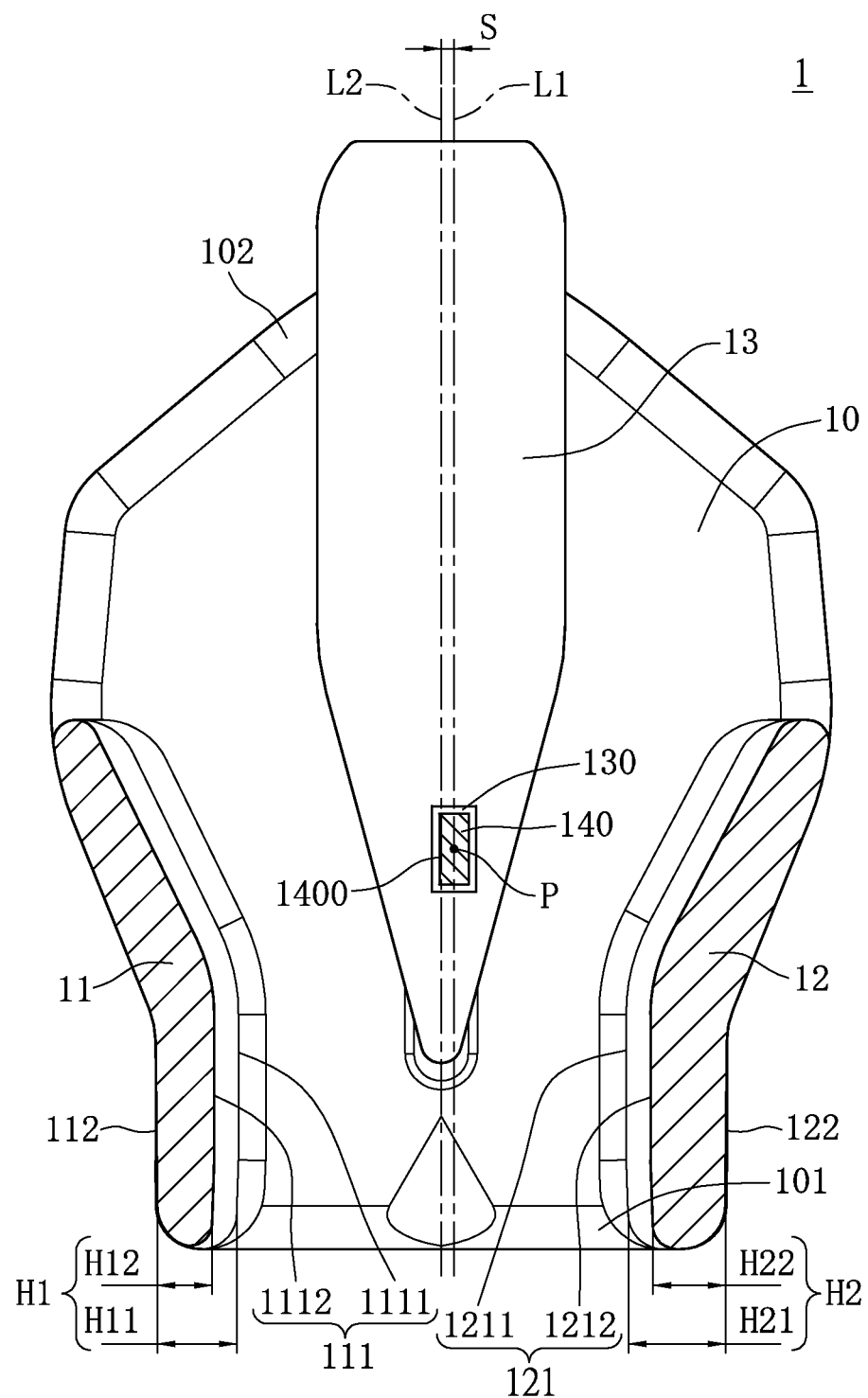
FIG. 4 shows a cross-sectional view taken along the section line II-II of FIG. 2.
Figure 5:
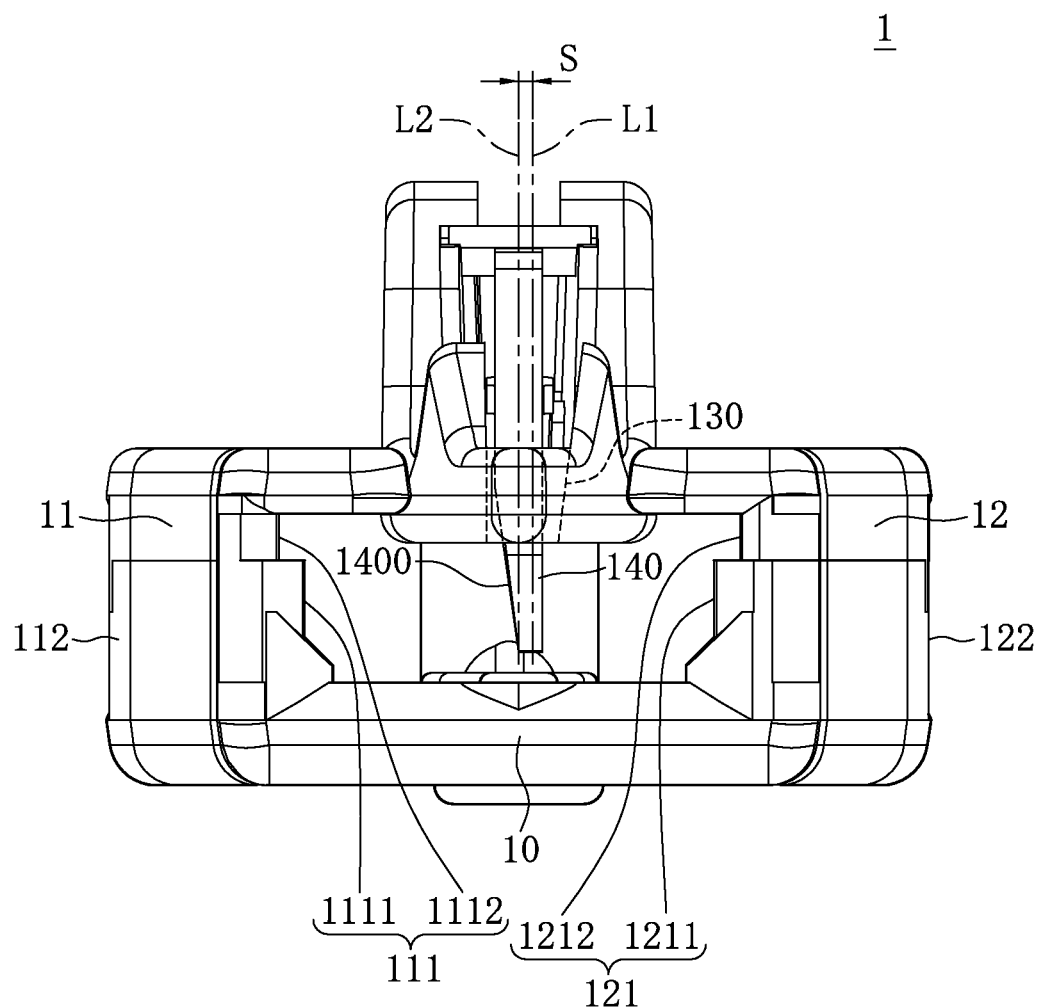
FIG. 5 shows a front, schematic view of a sliding member for increasing positioning effect according to the instant disclosure.

Moreover, referring to FIG. 4 and FIG. 5, the first lateral wall portion 11 has a first inner surface 111 and a first outer surface 112 opposite to (oppositely arranged to) the first inner surface 111, and the second lateral wall portion 12 has a second inner surface 121 corresponding to the first inner surface 111 and a second outer surface 122 opposite to the second inner surface 121. In addition, a first thickness H1 between the first inner surface 111 and the first outer surface 112 of the first lateral wall portion 11 is smaller than a second thickness H2 between the second inner surface 121 and the second outer surface 122 of the second lateral wall portion 12.

More precisely, referring to FIG. 4 and FIG. 5, the first inner surface 111 of the first lateral wall portion 11 is divided into a first primary inner surface 1111 and a first secondary inner surface 1112, and the second inner surface 121 of the second lateral wall portion 12 is divided into a second primary inner surface 1211 facing the first primary inner surface 1111 and a second secondary inner surface 1212 facing the first secondary inner surface 1112. As shown in FIG. 4 or FIG. 5, a first primary thickness H11 between the first primary inner surface 1111 and the first outer surface 112 of the first lateral wall portion 11 is smaller than a second primary thickness H21 between the second primary inner surface 1211 and the second outer surface 122 of the second lateral wall portion 12. As shown in FIG. 4 or FIG. 5, a first secondary thickness H12 between the first secondary inner surface 1112 and the first outer surface 112 of the first lateral wall portion 11 is smaller than a second secondary thickness H22 between the second secondary inner surface 1212 and the second outer surface 122 of the second lateral wall portion 12.

More precisely, referring to FIG. 4 and FIG. 5, the base portion 10 has a first symmetric center line L1 (i.e., a symmetry centerline or a symmetrical central line), and the seat portion 13 has a second symmetric center line L2. The first symmetric center line L1 can pass through a geometric center point P (as shown in FIG. 4) of the positioning through hole 130, and the second symmetric center line L2 of the seat portion 13 is horizontally moved relative to the first symmetric center line L1 of the base portion 10 by a predetermined horizontal offset S and along a horizontal direction from the second lateral wall portion 12 to the first lateral wall portion 11. For example, the predetermined horizontal offset S from the second symmetric center line L2 of the seat portion 13 to the first symmetric center line L1 of the base portion 10 can conform to the following formula: S=(H2−H1)/2, in which S is the predetermined horizontal offset, H1 is the first thickness, and H2 is the second thickness.

As shown in FIG. 4 or FIG. 5, it is worth mentioning that when the first symmetric center line L1 is used as a symmetrical baseline, the first outer surface 112 of the first lateral wall portion 11 and the second outer surface 122 of the second lateral wall portion 12 are symmetrically disposed relative to the first symmetric center line L1 (i.e., the first outer surface 112 and the second outer surface 122 are symmetrically disposed on opposite sides of the first symmetric center line L1). In addition, when the second symmetric center line L2 is used as a symmetrical baseline, the first primary inner surface 1111 of the first inner surface 111 of the first lateral wall portion 11 and the second primary inner surface 1211 of the second inner surface 121 of the second lateral wall portion 12 are symmetrically disposed relative to the second symmetric center line L2 (i.e., the first primary inner surface 1111 and the second primary inner surface 1211 are symmetrically disposed on opposite sides of the second symmetric center line L2), or the first secondary inner surface 1112 of the first inner surface 111 of the first lateral wall portion 11 and the second secondary inner surface 1212 of the second inner surface 121 of the second lateral wall portion 12 are symmetrically disposed relative to the second symmetric center line L2 (i.e., the first secondary inner surface 1112 and the second secondary inner surface 1212 are symmetrically disposed on opposite sides of the second symmetric center line L2).

Figure 6:
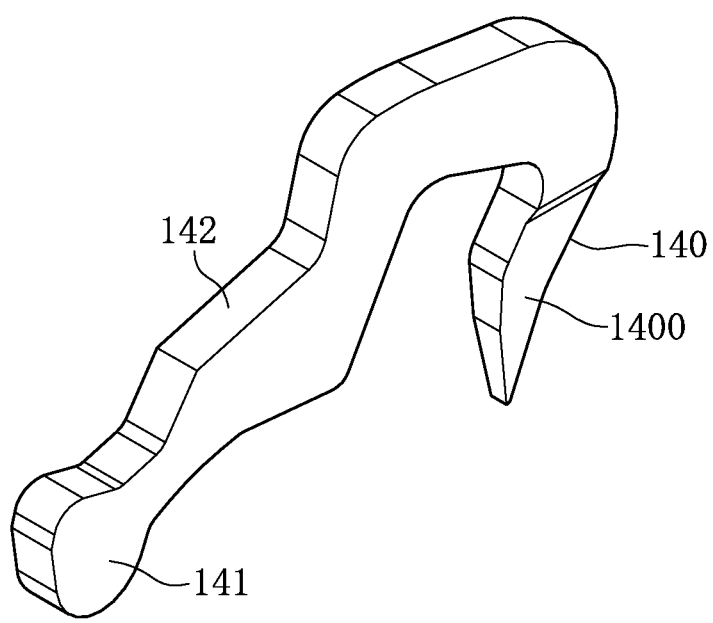
FIG. 6 shows a perspective, schematic view of a retaining body of a sliding member for increasing positioning effect according to the instant disclosure.

Furthermore, referring to FIG. 4, FIG. 5, and FIG. 6, the positioning portion 140 of the retaining body 14 has a cutting edge 1400 (such as a cutting plane) concaved on a lateral surface thereof and along an opposite direction opposite to the horizontal direction from the second lateral wall portion 12 to the first lateral wall portion 11, so that the positioning portion 140 is diverged (deviated) from the second symmetric center line L2 and adjacent to the first symmetric center line L1 (as shown in FIG. 5).

Figure 7:
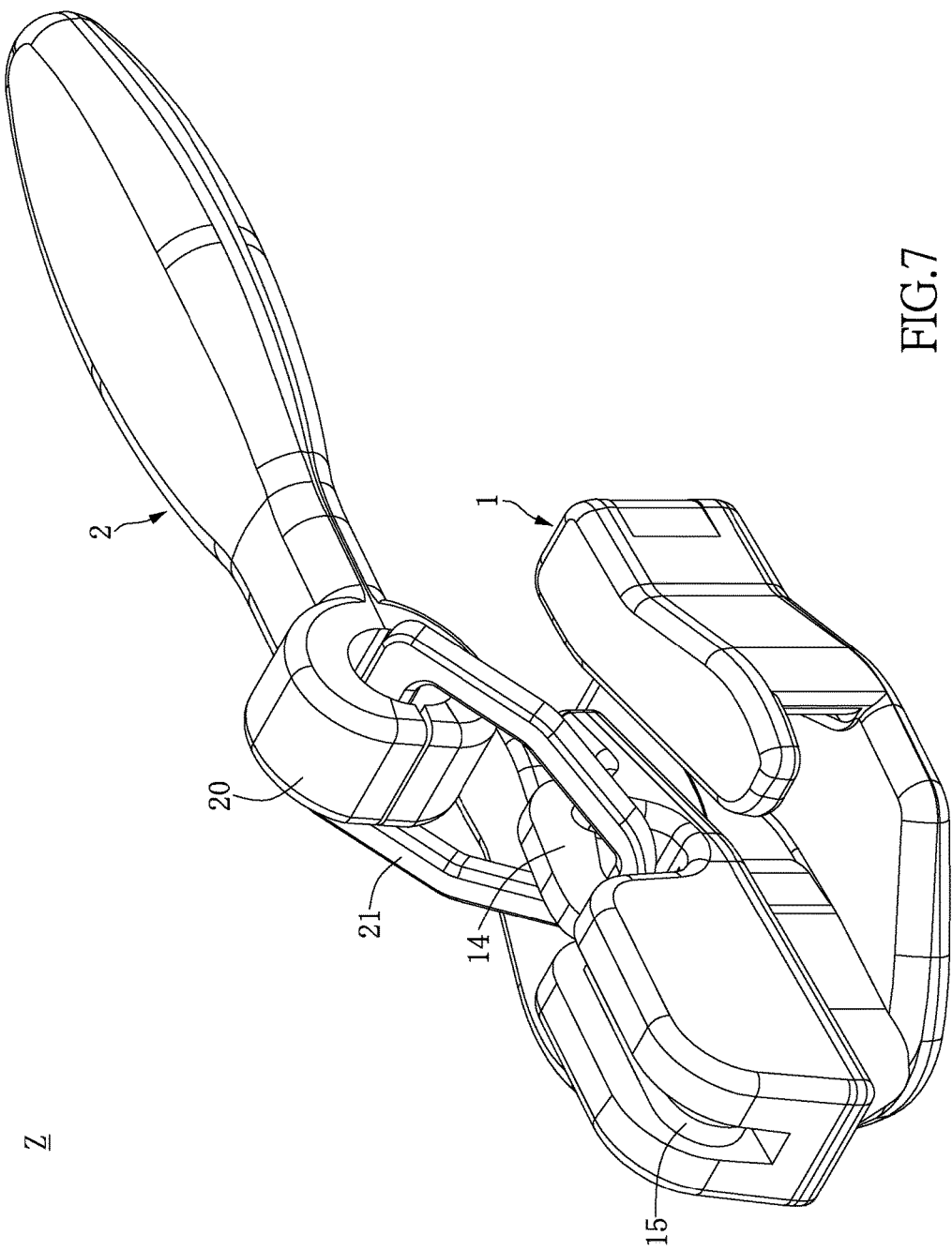
FIG. 7 shows a perspective, schematic view of an invisible zipper head assembly structure for increasing positioning effect according to one of embodiments of the instant disclosure.
Figure 8:
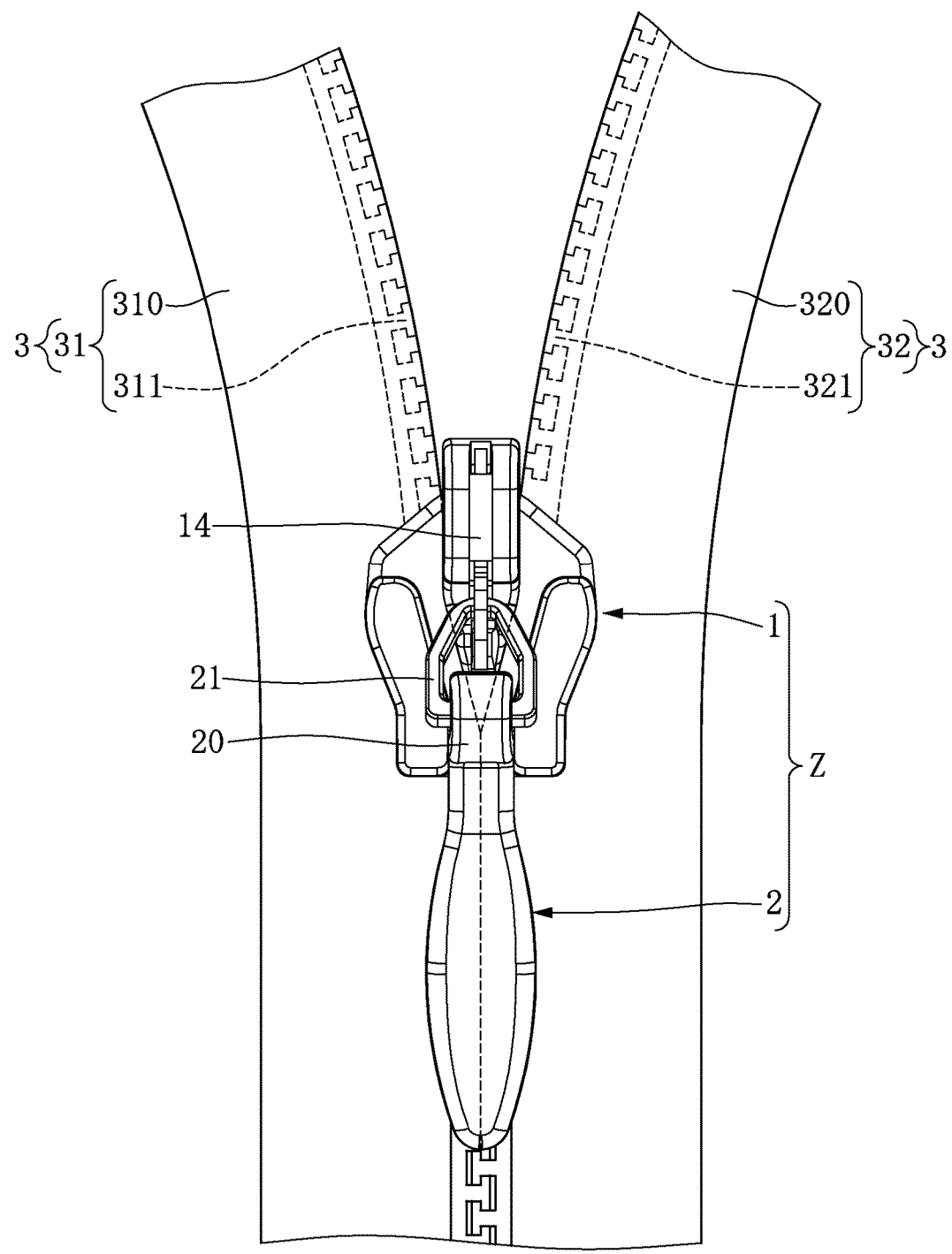
FIG. 8 shows a top, schematic view of an invisible zipper head assembly structure for increasing positioning effect slidably disposed on a zipper teeth structure according to the instant disclosure.
Figure 9:
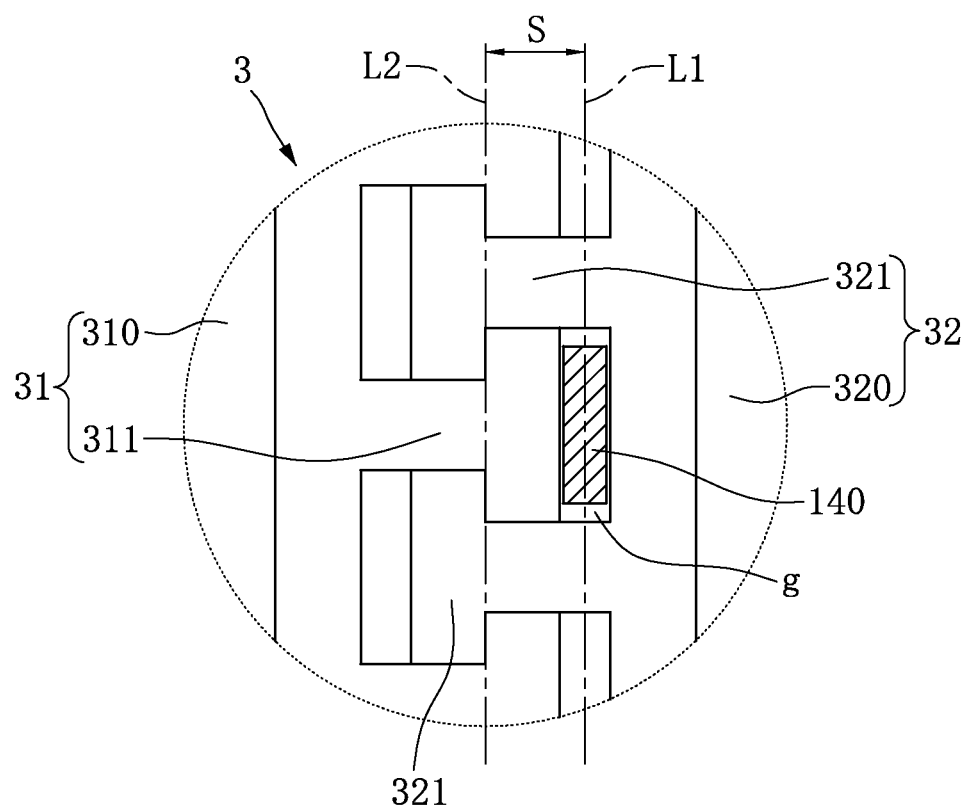
FIG. 9 shows an enlarged, schematic view of a positioning portion inserted into a gap between two adjacent second zipper teeth.

Referring to FIG. 7 to FIG. 9, one of embodiments of the instant disclosure provides an invisible zipper head assembly structure Z for increasing positioning effect disposed on a zipper teeth structure 3 (such as a zipper tape or a zipper strip) including a first zipper teeth member 31 (such as a zipper rack or a toothed bar) and a second zipper teeth member 32 mated with each other. The invisible zipper head assembly structure Z comprises a sliding member 1 and a pulling member 2 (such as a pull tab or a pull piece).

Referring to FIG. 1, FIG. 7 and FIG. 8, the sliding member 1 includes a base portion 10, a first lateral wall portion 11, a second lateral wall portion 12, a seat portion 13, and a retaining body 14 (such as a hook body or a horse-like hook).

First, referring to FIG. 1, FIG. 4, and FIG. 5, the first lateral wall portion 11 and the second lateral wall portion 12 are respectively extended upwardly from two opposite lateral sides of the base portion 10, and the first lateral wall portion 11 and the second lateral wall portion 12 correspond to each other and are connected to a front side portion 101 of the base portion 10. The seat portion 13 is disposed on the base portion 10 and is connected to a rear side portion 102 of the base portion 10, and the seat portion 13 has a positioning through hole 130 formed between the first lateral wall portion 11 and the second lateral wall portion 12. The retaining body 14 is movably disposed on the seat portion 13, and the retaining body 14 has a positioning portion 140 disposed on an end portion thereof and passing through the positioning through hole 130. The pulling member 2 is movably mated with the retaining body 14, for example, the pulling member 2 includes a movable piece 21 disposed on an end portion 20 thereof and movably mated with the retaining body 14.

More precisely, referring to FIG. 8 and FIG. 9, the first zipper teeth member 31 includes a first zipper teeth carrier 310 and a plurality of first zipper teeth 311 disposed on the first zipper teeth carrier 310, and the second zipper teeth member 32 includes a second zipper teeth carrier 320 and a plurality of second zipper teeth 321 disposed on the second zipper teeth carrier 320. In addition, as shown in FIG. 9, each of the first zipper teeth 311 can be retained between two adjacent second zipper teeth 321. When one of the first zipper teeth 311 is retained between two of the second zipper teeth 321 to form a gap P for receiving the positioning portion 140 (i.e., the positioning portion 140 is inserted into the gap (g) between the two adjacent second zipper teeth 321), the invisible zipper head assembly structure Z can be accurately positioned on the zipper teeth structure 3 by matching the positioning portion 140 and the gap (g).

Figure 10:
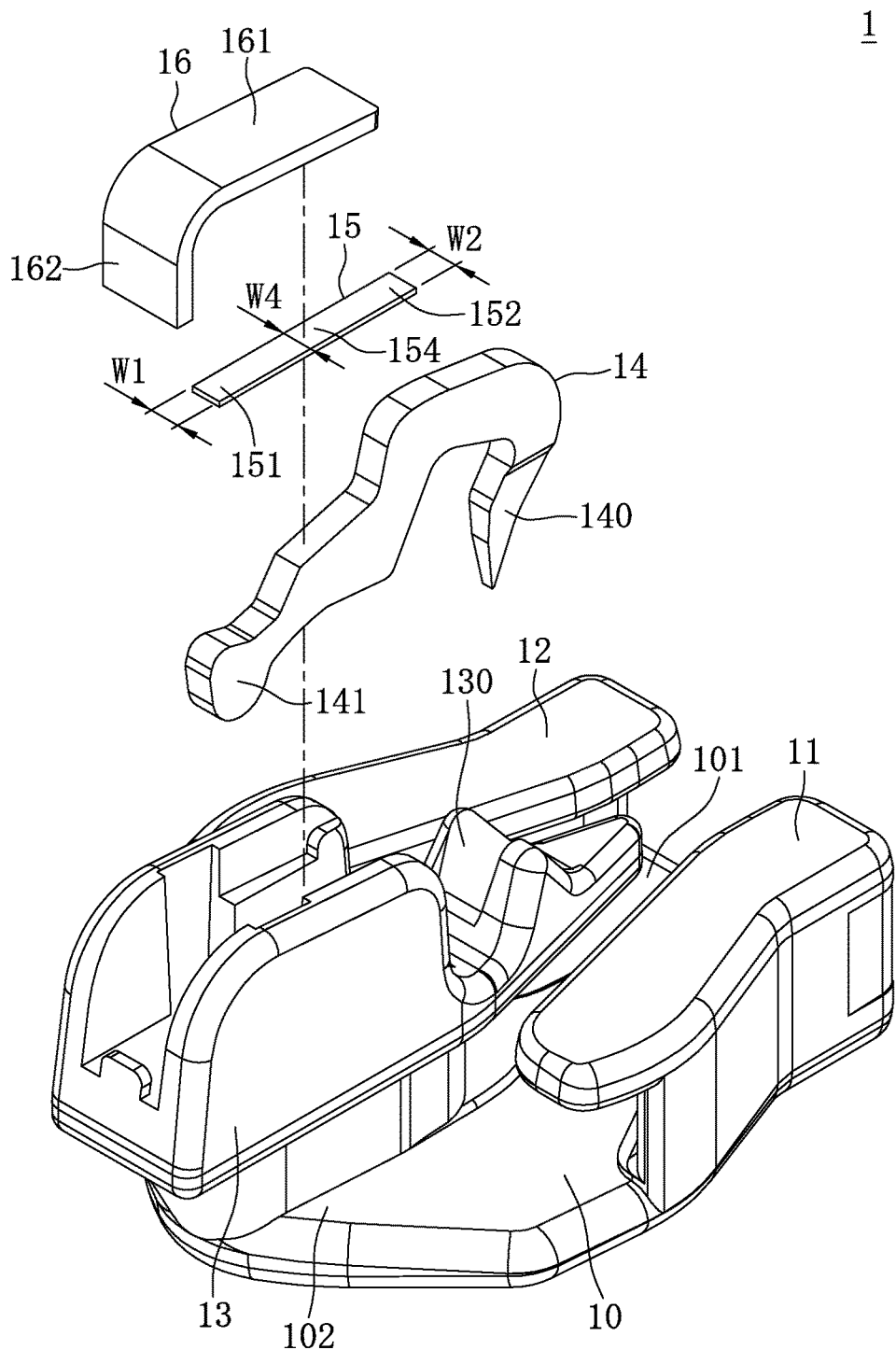
FIG. 10 shows a perspective, exploded, schematic view of a sliding member for increasing positioning effect according to another one of embodiments of the instant disclosure.
Figure 11:
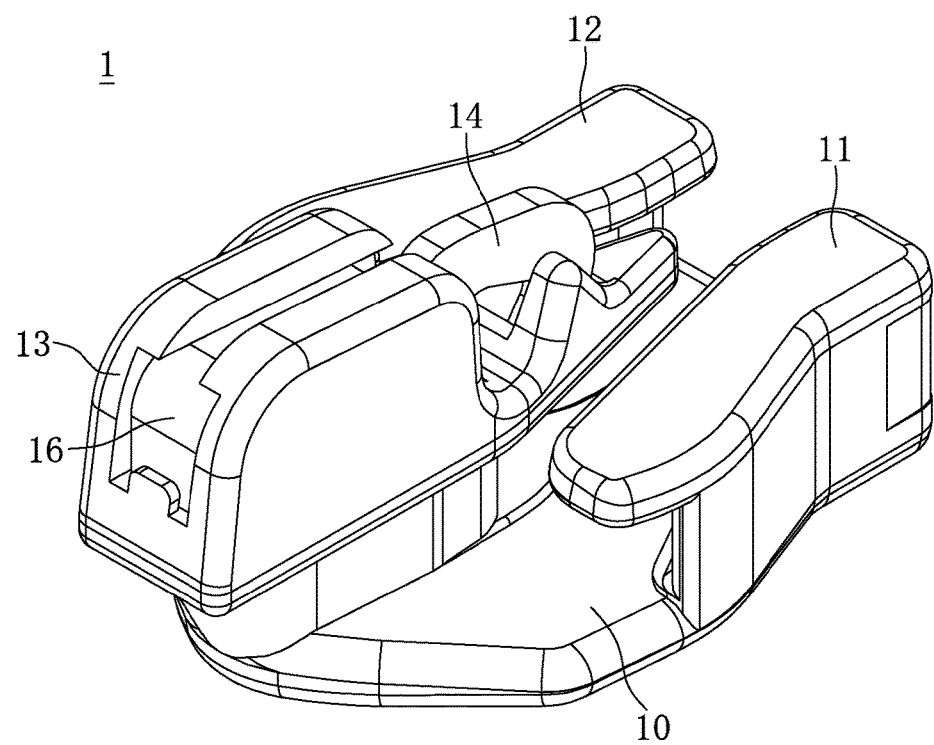
FIG. 11 shows a perspective, assembled, schematic view of a sliding member for increasing positioning effect according to another one of embodiments of the instant disclosure.
Figure 12:
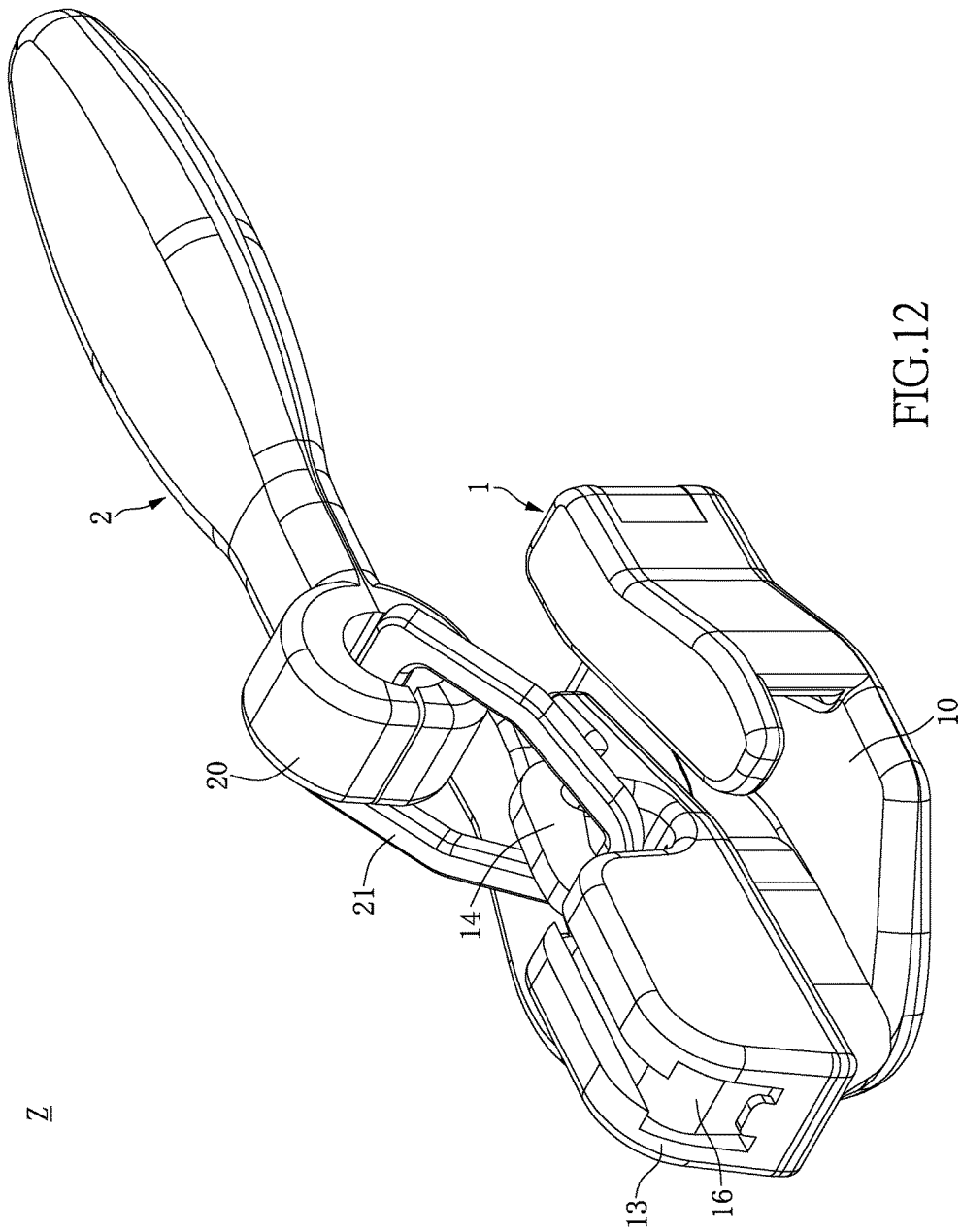
FIG. 12 shows a perspective, schematic view of an invisible zipper head assembly structure for increasing positioning effect according to another one of embodiments of the instant disclosure.

Referring to FIG. 10 to FIG. 12, another one of embodiments of the instant disclosure provides a sliding member 1 (such as a sliding head, or a slide fastener head) for increasing positioning effect, and the sliding member 1 comprises a base portion 10, a first lateral wall portion 11, a second lateral wall portion 12, a seat portion 13, an elastic component 15, and a retaining body 14 (such as a hook body or a horse-like hook).

First, referring to FIG. 10 and FIG. 11, the first lateral wall portion 11 and the second lateral wall portion 12 are respectively extended upwardly from two opposite lateral sides of the base portion 10, and the first lateral wall portion 11 and the second lateral wall portion 12 correspond to each other and are connected to a front side portion 101 of the base portion 10. The seat portion 13 is disposed on the base portion 10 and is connected to a rear side portion 102 of the base portion 10, and the seat portion 13 has a positioning through hole 130 formed between the first lateral wall portion 11 and the second lateral wall portion 12. The elastic component 15 is disposed inside the seat portion 10. The retaining body 14 is movably disposed on the seat portion 13 and movably contacts the elastic component 15, and the retaining body 14 has a positioning portion 140 disposed on an end portion thereof and passing through the positioning through hole 130.

More particularly, referring to FIG. 10 and FIG. 11, the elastic component 15 is covered with a cover piece 16 that is fixed on the seat portion 13, and cover piece 16 has a plate portion 161 and a bending portion 162 bent downwardly from one end of the plate portion 161. In addition, the elastic component 15 has a fixed retaining portion 151 fixed inside the seat portion 13, a movable contacting portion 152 opposite to the fixed retaining portion 151, and a straight connection portion 154 connected between the fixed retaining portion 151 and the movable contacting portion 152. Moreover, the retaining body 14 has an embedded portion 141 opposite to the positioning portion 140 and disposed inside a receiving groove 131 (as shown in FIG. 3) of the seat portion 13 and an abutting portion 142 disposed between the positioning portion 140 and the embedded portion 141 and movably contacting the movable contacting portion 152. For example, the fixed retaining portion 151, the straight connection portion 154, and the movable contacting portion 152 are sequentially connected to one another to form a plate-shaped elastic piece, and the width W1 of the fixed retaining portion 151, the width W4 of the straight connection portion 154, and the width W2 of movable contacting portion 152 are substantially the same.

In conclusion, when the first thickness H1 between the first inner surface 111 and the first outer surface 112 of the first lateral wall portion 11 is smaller than the second thickness H2 between the second inner surface 121 and the second outer surface 122 of the second lateral wall portion 12, and the second symmetric center line L2 of the seat portion 13 is horizontally moved relative to the first symmetric center line L1 of the base portion 10 by a predetermined horizontal offset S and along a horizontal direction from the second lateral wall portion 12 to the first lateral wall portion 11, the whole of the invisible zipper head assembly structure Z except the positioning through hole 130 is slightly diverged (deviated) along a direction toward the first symmetric center line L1, so that the positioning through hole 130 cannot be covered by the zipper teeth structure 3 and the positioning through hole 130 can be aligned with the gap P. Hence, when one of the first zipper teeth 311 is retained between two of the second zipper teeth 321 to form a gap P and the positioning portion 140 is inserted into the gap (g) between the two adjacent second zipper teeth 321, the invisible zipper head assembly structure Z can be accurately positioned on the zipper teeth structure 3 by matching the positioning portion 140 and the gap (g).

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. An invisible zipper head assembly structure, comprising:
a sliding member having a base portion, a first lateral wall portion, a second lateral wall portion, a seat portion, an elastic component, and a retaining body, wherein the first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole; and
a pulling member movably mated with the retaining body;
wherein the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion;
wherein the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion.

2. The invisible zipper head assembly structure of claim 1, wherein the elastic component has a fixed retaining portion retained inside the seat portion, a movable contacting portion opposite to the fixed retaining portion and parallel to the fixed retaining portion, and a bending connection portion connected between the fixed retaining portion and the movable contacting portion.

3. The invisible zipper head assembly structure of claim 2, wherein the retaining body has an embedded portion opposite to the positioning portion and disposed inside a receiving groove of the seat portion and an abutting portion disposed between the positioning portion and the embedded portion and movably contacting the movable contacting portion.

4. The invisible zipper head assembly structure of claim 3, wherein the fixed retaining portion, the bending connection portion, and the movable contacting portion are sequentially connected to one another to form a U-shaped elastic piece, wherein the width of the movable contacting portion is larger than the width of the bending connection portion, and the width of the fixed retaining portion is larger than the width of movable contacting portion.

5. The invisible zipper head assembly structure of claim 1, wherein the elastic component is covered with a cover piece fixed on the seat portion, the elastic component has a fixed retaining portion fixed inside the seat portion, a movable contacting portion opposite to the fixed retaining portion, and a straight connection portion connected between the fixed retaining portion and the movable contacting portion.

6. The invisible zipper head assembly structure of claim 5, wherein the retaining body has an embedded portion opposite to the positioning portion and disposed inside a receiving groove of the seat portion and an abutting portion disposed between the positioning portion and the embedded portion and movably contacting the movable contacting portion.

7. The invisible zipper head assembly structure of claim 6, wherein the fixed retaining portion, the straight connection portion, and the movable contacting portion are sequentially connected to one another to form a plate-shaped elastic piece, wherein the width of the fixed retaining portion, the width of the straight connection portion, and the width of movable contacting portion are substantially the same.

8. A sliding member comprising a base portion, a first lateral wall portion, a second lateral wall portion, a seat portion, an elastic component, and a retaining body, wherein the first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole;

wherein the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion;

wherein the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion.

9. The sliding member of claim 8, wherein the elastic component has a fixed retaining portion retained inside the seat portion, a movable contacting portion opposite to the fixed retaining portion and parallel to the fixed retaining portion, and a bending connection portion connected between the fixed retaining portion and the movable contacting portion.

10. The invisible zipper head assembly structure of claim 9, wherein the retaining body has an embedded portion opposite to the positioning portion and disposed inside a receiving groove of the seat portion and an abutting portion disposed between the positioning portion and the embedded portion and movably contacting the movable contacting portion.

11. The invisible zipper head assembly structure of claim 10, wherein the fixed retaining portion, the bending connection portion, and the movable contacting portion are sequentially connected to one another to form a U-shaped elastic piece, wherein the width of the movable contacting portion is larger than the width of the bending connection portion, and the width of the fixed retaining portion is larger than the width of movable contacting portion.

12. The sliding member of claim 8, wherein the elastic component has a fixed retaining portion retained inside the seat portion, a movable contacting portion opposite to the fixed retaining portion and parallel to the fixed retaining portion, and a bending connection portion connected between the fixed retaining portion and the movable contacting portion.

13. The invisible zipper head assembly structure of claim 12, wherein the retaining body has an embedded portion opposite to the positioning portion and disposed inside a receiving groove of the seat portion and an abutting portion disposed between the positioning portion and the embedded portion and movably contacting the movable contacting portion.

14. The invisible zipper head assembly structure of claim 13, wherein the fixed retaining portion, the bending connection portion, and the movable contacting portion are sequentially connected to one another to form a U-shaped elastic piece, wherein the width of the movable contacting portion is larger than the width of the bending connection portion, and the width of the fixed retaining portion is larger than the width of movable contacting portion.

15. An invisible zipper head assembly structure disposed on a zipper teeth structure including a first zipper teeth member and a second zipper teeth member mated with each other, the invisible zipper head assembly structure comprising:

a sliding member having a base portion, a first lateral wall portion, a second lateral wall portion, a seat portion, an elastic component, and a retaining body, wherein the first lateral wall portion and the second lateral wall portion are respectively extended upwardly from two opposite lateral sides of the base portion, the first lateral wall portion and the second lateral wall portion correspond to each other and are connected to a front side portion of the base portion, the seat portion is disposed on the base portion and is connected to a rear side portion of the base portion, the seat portion has a positioning through hole formed between the first lateral wall portion and the second lateral wall portion, the elastic component is disposed inside the seat portion, the retaining body is movably disposed on the seat portion and movably contacts the elastic component, the retaining body has a positioning portion disposed on an end portion thereof and passing through the positioning through hole; and a pulling member movably mated with the retaining body;

wherein the first lateral wall portion has a first inner surface and a first outer surface opposite to the first inner surface, the second lateral wall portion has a second inner surface corresponding to the first inner surface and a second outer surface opposite to the second inner surface, a first thickness between the first inner surface and the first outer surface of the first lateral wall portion is smaller than a second thickness between the second inner surface and the second outer surface of the second lateral wall portion;

wherein the base portion has a first symmetric center line, the seat portion has a second symmetric center line, the first symmetric center line passes through a geometric center point of the positioning through hole, the second symmetric center line of the seat portion is horizontally moved relative to the first symmetric center line of the base portion by a predetermined horizontal offset and along a horizontal direction from the second lateral wall portion to the first lateral wall portion;

wherein the first zipper teeth member includes a first zipper teeth carrier and a plurality of first zipper teeth disposed on the first zipper teeth carrier, the second zipper teeth member includes a second zipper teeth carrier and a plurality of second zipper teeth disposed on the second zipper teeth carrier, and one of the first zipper teeth is retained between two of the second zipper teeth to form a gap for receiving the positioning portion.

16. The invisible zipper head assembly structure of claim 15, wherein the predetermined horizontal offset from the second symmetric center line of the seat portion to the first symmetric center line of the base portion conforms to the following formula: $S=(H2-H1)/2$, wherein S is the predetermined horizontal offset, H1 is the first thickness, and H2 is the second thickness, wherein the first outer surface of the first lateral wall portion and the second outer surface of the second lateral wall portion are symmetrically disposed relative to the first symmetric center line, the first inner surface of the first lateral wall portion and the second inner surface of the second lateral wall portion are symmetrically disposed relative to the second symmetric center line.

17. The invisible zipper head assembly structure of claim 15, wherein the positioning portion of the retaining body has a cutting edge concaved on a lateral surface thereof and along an opposite direction opposite to the horizontal direction, so that the positioning portion is diverged from the second symmetric center line and adjacent to the first symmetric center line.

18. The invisible zipper head assembly structure of claim 15, wherein the first inner surface of the first lateral wall portion is divided into a first primary inner surface and a first secondary inner surface, and the second inner surface of the second lateral wall portion is divided into a second primary inner surface facing the first primary inner surface and a second secondary inner surface facing the first secondary inner surface, wherein a first primary thickness between the first primary inner surface and the first outer surface of the first lateral wall portion is smaller than a second primary thickness between the second primary inner surface and the second outer surface of the second lateral wall portion, and a first secondary thickness between the first secondary inner surface and the first outer surface of the first lateral wall portion is smaller than a second secondary thickness between the second secondary inner surface and the second outer surface of the second lateral wall portion.

* * * * *